United States Patent [19]

Ryntz, Jr.

[11] Patent Number: 5,223,051

[45] Date of Patent: Jun. 29, 1993

[54] METHOD OF PRODUCING CAST-TO-SIZE TOOLS

[75] Inventor: Edward F. Ryntz, Jr., Warren, Mich.

[73] Assignee: General Motors Corporation, Detroit, Mich.

[21] Appl. No.: 837,123

[22] Filed: Feb. 19, 1992

[51] Int. Cl.⁵ .................. C21D 8/00; B23P 17/00; B22D 25/00
[52] U.S. Cl. .................. 148/538; 29/402.05; 29/402.21; 29/425; 29/526.3; 29/527.5; 29/DIG. 5; 76/107.1; 76/DIG. 3; 164/168; 164/DIG. 15
[58] Field of Search ....... 148/538; 164/168, DIG. 15; 29/527.5, DIG. 5, 526.3, 402.21, 402.05, 425; 76/107.1, DIG. 3

[56] References Cited

U.S. PATENT DOCUMENTS

| | | | |
|---|---|---|---|
| 1,929,909 | 10/1933 | Wheeler et al. | 76/DIG. 3 |
| 2,656,593 | 10/1953 | Heintz | 29/527.5 |

Primary Examiner—R. Dean
Assistant Examiner—Robert R. Koehler
Attorney, Agent, or Firm—George A. Grove

[57] ABSTRACT

A process for producing multipiece complementary tooling castings is disclosed in which hollow internal surfaces are cast in a mold having a soft, low strength sand core piece to define such hollow portions and external surfaces are cast against hard, resin-bonded sand mold surfaces. The castings are removed from their respective molds while still warm and nested and pressed together to bring their working surfaces into conformance with each other. The result of this practice is a set of tool pieces that require little machining and display high accuracy in their as-cast condition.

5 Claims, 2 Drawing Sheets

METHOD OF PRODUCING CAST-TO-SIZE TOOLS

This invention pertains to the making of cast tools such as metal stamping dies and plastic molding dies. More particularly, this invention relates to a mold making and casting practice by which such dies can be cast very close to their final working surface dimensions so as to reduce or eliminate the machining of the die surfaces.

BACKGROUND OF THE INVENTION

Many manufactured products are made by drawing sheet metal or molding a synthetic resinous material between a closely matched set of die surfaces. In order to carry out such metal drawing or molding operations, it is necessary to provide suitable tooling in the form of draw dies or mold sections. The part-shaping surface of such tools must be carefully made to precisely shape the workpiece to be drawn or molded into the three-dimensional configuration of the desired part.

Such tools have been used for many years. They are usually hard, massive bodies that are used in combination of two or more tool details (or simply details) in a powerful press. The press operates to separate the dies for the insertion of, e.g., a sheet metal blank. The press then closes and the blank is pushed by a convex tool (a male punch) into a concave cavity (a female punch). The flow of the metal is frequently controlled by a binder ring that operates in cooperation with the punches.

Such tools are typically made by casting a metal alloy of suitable hardness and durability into a configuration that duplicates as closely as possible the shape of the articles to be formed. Each of these castings may weigh hundreds or thousands of kilograms. Despite improvements in the casting of such tools, it has almost always been necessary to machine the cast metal forming surface of the tool to provide the desired surface shape and dimensions. The machining is required because the casting always undergoes shrinkage and distortion as it solidifies and cools to ambient temperature. Certain alloy compositions are known to undergo minimal shrinkage during the casting process. An example of such an alloy is Kirksite, a zinc-based alloy containing aluminum and copper of approximately ternary eutectic composition. However, even such low shrinkage, castable compositions still undergo some distortion from the intended configuration during the casting process and on cooling to room temperature.

It is known to design and construct patterns of the casting that are oversized to allow for shrinkage of the molten metal on solidification and cooling. It is also known to provide relatively hard mold surfaces to resist misshapen molds when the hot metal is poured. These practices have provided improvements in the accuracy of large castings, but have not solved the problem of producing a cast-to-size stamping die or mold tool.

The problem is further complicated by the fact that such tools comprise combinations of details that are intended to mate. However, each tool detail deforms in the casting process to exacerbate the problem. For example, many sets of sheet metal drawing dies comprise at least three members; for example, a male punch, a female punch and a binder ring. In general, the male and female punches have mating surfaces over and against which the sheet metal is stretched and drawn into the configuration of the desired part. The binder ring is shaped to fit about the male punch and to engage the sheet metal and control its flow as it is pushed into the female cavity.

In the case of the automobile industry, for example, scores of body parts such as door panels, fenders, hoods, roofs, trunk lids, body pillars and brackets are formed by sheet metal drawing or stamping operations, and each part requires a set of tools. The cost of such tools greatly increases when each member of the set must be cast and then machined to a final configuration. Such sheet metal drawing operations, plastic molding operations and the like would benefit greatly from a practice which would produce all pieces of a die set to substantially their final configuration in the as-cast condition.

It is an object of this invention to provide a method that combines both a sand mold preparation and casting practice by which a set of unmachined tool castings, e.g., a male punch, a female punch and a binder ring, are all brought into very close conformation with their desired shapes and dimensions. In other words, the complementary material-shaping surfaces of the two punches and the binder ring are cast such that when the castings reach room temperature, the working surfaces are in their desired finished conditions.

It is a further object of this invention to provide a method of preparing molds particularly suitable to the casting of the binder ring and, when necessary, the female punch so as to minimize distortion of these cored parts upon casting. It is a further object of this invention to provide a complementary practice of casting and handling the castings of such tool details that they interact with each other in the final shaping of each piece.

In accordance with the preferred embodiment of my invention, these and other objects and advantages are accomplished as follows.

BRIEF DESCRIPTION OF THE INVENTION

For purposes of illustration, the practice of my invention will be described in an embodiment using a zinc-based alloy. My preferred alloy is one that has measurable shrinkage characteristics but is more durable than Kirksite. It consists essentially by weight of about 10 percent copper, 4 percent aluminum, 0.04 percent magnesium, 0.04 percent iron and the balance, except for incidental impurities, substantially all zinc.

The practice of my invention will always involve the preparation of at least two, usually three and sometimes up to four large tool detail castings. Typically, such castings comprise a male punch with a convex working surface, a female punch with a concave working surface, and a binder ring with a hollow interior.

It is known that in most instances the male punch casting is easiest to cast to size. Its working surface does not require a core to define its shape. The shrinkage of the metal at the working surface is entirely in an inward direction and unimpeded. Therefore, so long as the male punch pattern is prepared in a manner that precisely accounts for metal shrinkage upon solidification and cooling and a suitably hard mold surface is employed, the configuration of the cast punch will be accurate. The principal tool details that are difficult to cast to size are binder rings (and certain cored female punches) because they have hollow portions or concavities and must shrink against a core or like mold surfaces.

In accordance with the mold preparation aspect of my invention, I provide hard, unyielding resin-bonded sand mold surfaces for the male punch, at least noncored surfaces of the female punch and the outer periphery of the binder ring. However, I employ a softer oil-bonded green sand for mold surfaces defining the internal periphery of the binder ring and internal surfaces of the female punch that are defined by large or deep core bodies. This combination of outer hard mold surface for the binder ring and more compressible internal mold surfaces permits the binder ring to shrink in a predictable way without excessive deformation. Further details of this mold preparation aspect of my invention will be described in more detail below.

In accordance with a particularly critical aspect of my invention, the casting of such a three-piece die set is timed so that despite substantial differences in their mass and cooling rate, they can be removed from their respective molds (an operation sometimes called "shakeout") while still relatively hot and plastic or pliable. Preferably, the casting of the three pieces is coordinated so that they can be shaken out from the mold and nested and pressed together with their working faces in their operative positions under suitably high pressure so that as the cast tools cool to ambient temperature, the faces conform to each other in their desired respective final configurations. When the punches and binder rings have been cast of the above alloy, it is preferred, for example, to shake out the male punch (with its higher as-cast accuracy) at the lowest temperature (e.g., 120° C.) and the female punch and binder ring at higher temperatures (e.g., 175° C. and 220° C., respectively). Thus, the male punch working face serves as the master tool surface against which the other cast surfaces conform as they cool.

I have used this mold preparation and casting nesting practice for tooling pieces, each weighing one or more tonnes. The practice has uniformly resulted in the preparation of multi-piece tool sets in which the punch and binder ring surfaces display a remarkably close fit, typically within one millimeter of the finish dimensions, in the as-cast condition. By casting the several pieces with such accuracy, final machining of the working surfaces is eliminated or greatly reduced. Only hand finishing is required, thereby reducing preparation time and labor cost.

These and other objects of my invention will become more apparent from a detailed description thereof which follows. In this description, reference will be had to the drawings as described below.

DESCRIPTION OF THE PREFERRED EMBODIMENT

The practice of my invention will be illustrated using the above-described durable alloy consisting essentially by weight of 10 to 11 percent copper, 3 to 4 percent aluminum, 0.035 to 0.055 percent magnesium, 0.06 percent maximum iron and the balance zinc, except for incidental impurities. The specific composition used consisted essentially by weight of 10 percent copper, 4 percent aluminum, 0.04 percent magnesium, 0.04 percent iron and the balance zinc. This alloy is very useful because of its hardness and strength and because it can be cast at temperatures below 600° C. Tooling for prototype steel parts and for up to several thousand production pieces can readily be prepared by this practice using this alloy.

Each step in the practice of my method is carried out carefully so as to achieve the best accuracy possible in the surface dimensions of each finished tool detail.

The preparation of foundry patterns is a known and skilled art. In the practice of my invention, one starts with a dimensionally correct pattern for each of the male punch, the female punch and the binder ring. A number of different materials are suitable for accurate and durable patterns, such as wood, high density expanded polystyrene foam and epoxy composites. Each can be machined and finished to the desired dimensions. As with all foundry patterns, the dimensions of the finished pattern are expanded to allow for volumetric contraction of the specific cast metal as it solidifies and cools to room temperature. The shrinkage allowance for a specific alloy to be cast is known or can readily be determined through simple casting trials. This data is then applied when machining a pattern. In the manufacture of tools from the zinc-based alloy described above, it has been recognized that high density (0.32 grams/cm$^3$) expanded polystyrene foam will give a dimensionally accurate pattern that does not deform under mold-making conditions.

In this example, the patterns are used to make three sets of cope and drag mold parts for the three tools to be produced. Generally in the casting of these large tool pieces, the drag mold portion contains the working face and body of the cast tool as well as gates and runners needed to convey the molten alloy into the casting cavity. A balanced or symmetrical runner/gating system that introduces metal uniformly into the drag mold cavity to minimize thermal gradients and stresses upon cooling is desirable and necessary for a dimensionally accurate casting. The cope mold generally contain only risers for the casting.

Figure 1:
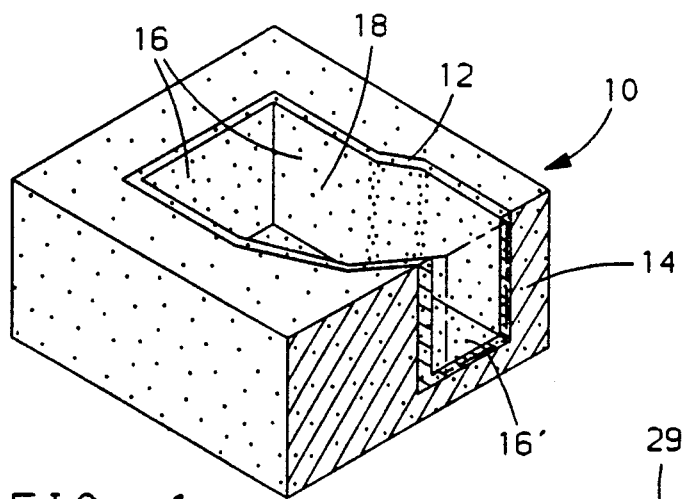
FIG. 1 is a perspective view partly in section of the drag portion of a foundry mold for casting a male punch in accordance with my invention.

Reference will now be had to the drawing figures. FIG. 1 illustrates the drag portion of a mold which has been formed to make the male punch. For purposes of simplification, this FIG. 1 is partly broken away and in section and illustrates only the casting cavity. It does not illustrate the gating and runner system which foundrymen well know how to provide in the mold. Also, for purposes of simplification in the drawing, the tooling parts depicted herein are intended to generically represent any tool. However, they are not drawn with the rounded and curved working surfaces that are normal in such tools.

Male punch drag mold 10 is made with resin-bonded, fine grained (e.g., AFS grain size #101) zircon (zirconium silicate) sand lining layer 12 that constitutes the cavity-defining surfaces 16 (cavity is 18) which shape the working face of the cast tool. This lining 12 is backed by a resin-bonded silica sand (e.g., AFS grain size #48) body 14. This resin-bonded zircon sand facing/silica sand backing mold 10 is necessary to provide resistance to the pressure of the molten metal as it flows into it and to retain the desired shape of the male punch. The cast punch, of course, is formed in the cavity 18 defined by zircon sand layer 16. Bottom surface 16' of the cavity 18 will define the portion of the punch (shown at 50 in FIG. 4) that first engages the sheet metal that it draws in cooperation with the female punch and the binder ring. The top of the punch will be defined by the cope portion of the mold, not shown.

It is preferred to use zircon sand in the resin-bonded surfaces of my molds because it is available in the form of fine rounded grains (e.g., AFS grain size #101 that provide a smooth, accurate mold surface that is replicated in the casting surface. Furthermore, zircon sand has a relatively low coefficient of linear thermal expansion, $0.0054°$ $C.^{-1}$ at room temperature, and relatively high thermal conductivity, $32 \times 10^{-4}$ cal/cm/° C./sec at 0° C. These properties contribute to suitable solidification of the cast metal and accuracy of the cast surface. Other sands having similar properties and characteristics, e.g , chromite sand $[(Fe,Mg)O.(Cr,Al,Fe)_2O_3]$, may be substituted for zircon.

Silica sand is preferred for backing up the zircon surface layer and for coring applications as will be described. Silica is inexpensive and abundant. Its somewhat higher coefficient of linear expansion, $0.032°$ $C.^{-1}$, and lower thermal conductivity, $20 \times 10^{-4}$ cal/cm/° C./sec, are suitable in these applications.

The molding sand—both the zircon adjacent to the pattern surface and the silica away from the pattern—was bonded with Ashland Linocure (oil modified alkyd resin) air set resin. One hundred parts of zircon sand was mixed with 1.0 parts of resin, and 100 parts of silica sand was mixed with 1.5 parts of resin. The sands were packed about the pattern in a suitable flask and the resin allowed to polymerize. The pattern was then removed and the mold readied for pouring.

In this illustration, the male punch is the easiest casting to form with high dimensional accuracy on its working surface. Because of its shape, all of the shrinkage tends to be in an inward direction, and there is no distortion around any core piece or other section of the mold which would contribute to a distortion or change in dimension of this punch.

The combination of the predictable shrink zinc alloy and the hard mold surface with the zircon sand face layer usually makes it possible to cast a male punch that is accurate to within one millimeter of the final dimensions on its working surface. This high degree of dimensional accuracy on the male punch allows its use as a master to which the female punch and binder ring are made to conform, as will be seen later in the description of the process.

Figure 2:
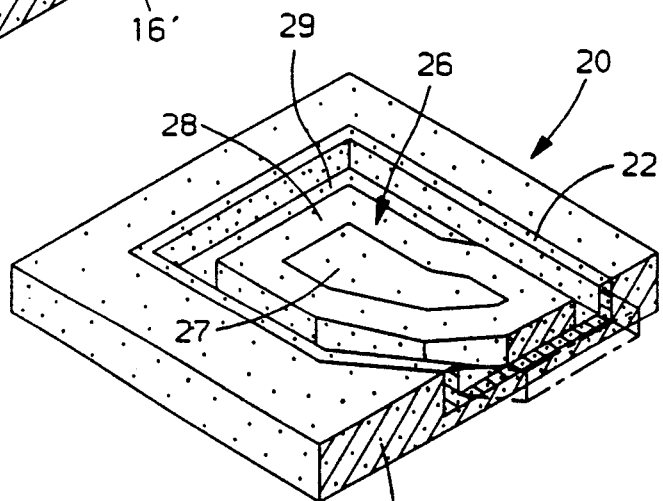
FIG. 2 is a perspective view partly broken away and in section of the drag portion of a foundry mold for casting a binder ring.
Figure 4:
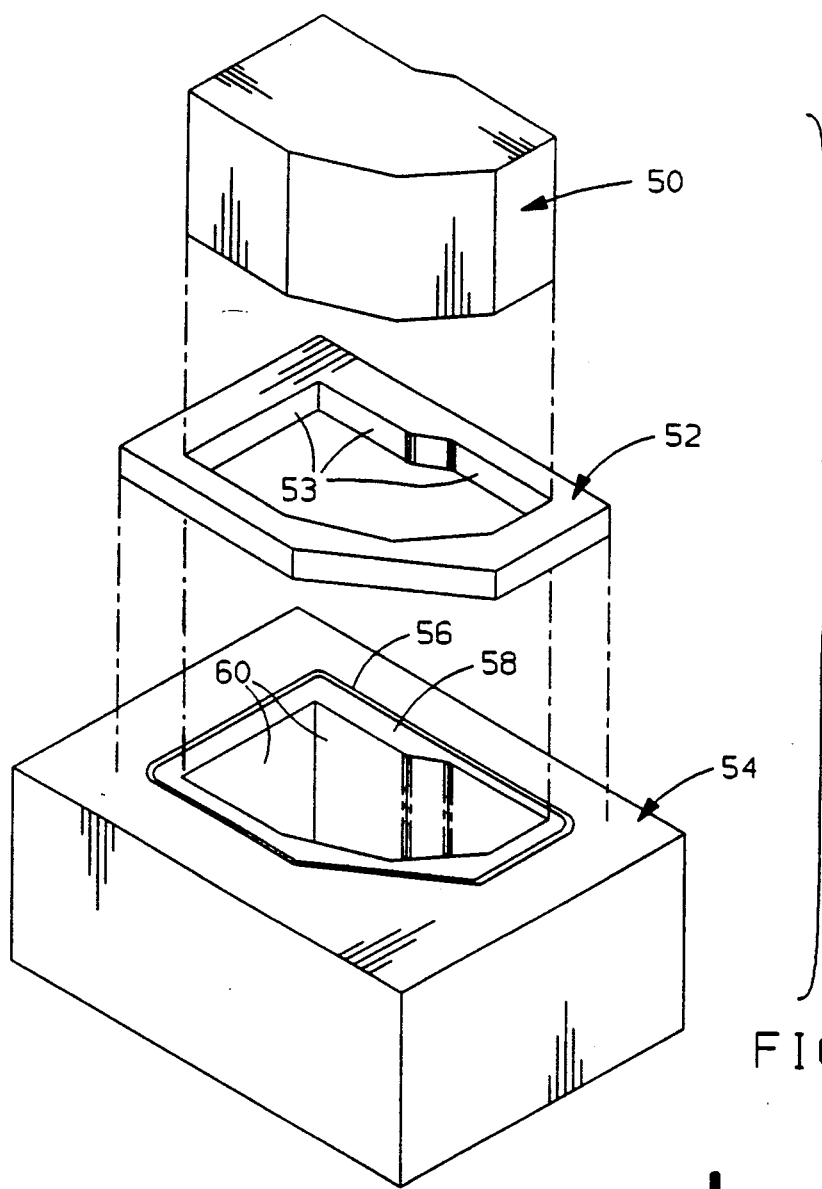
FIG. 4 is an exploded perspective view of a generically representative male punch, binder ring and female punch as in their press open position.

FIG. 2 illustrates (in perspective, partly in section and broken away) a drag mold 20 for forming the binder ring (seen at 52 in FIG. 4). The preparation of this mold is one of the critical aspects in the practice of my invention. This drag mold 20 is made as follows. The binder ring pattern (not shown) was positioned on a molding plate within a flask wall. Placed in the center of the ring pattern was a polystyrene foam plug of low density. Molding sand (coated with Ashland Linocure as described) was then packed around the outside and top of the ring pattern, first to form the facing layer 22 of the resin-bonded zircon sand and then the body portion 24 of the resin-bonded silica sand. The resin hardened upon standing in air after the sand was packed in place. At this stage, the binder ring drag mold 20 consisted of body section 24 and cavity liner section 22. After the resin had cured, the partly-completed mold was rolled over and the polystyrene plug was removed. Then, the area within the pattern (not shown in FIG. 2) was filled in with a differently prepared silica sand to make the central core portion 26 of mold 20. The polystyrene plug had temporarily occupied the space that ultimately becomes core 26.

Here, the silica sand was bonded with a suitable oil binder to produce a pliable green sand which was packed to shape the internal walls 53 of the binder ring 52. This silica sand was mixed, e.g., with Petro Bond binder, produced by Baroid Drilling Fluids of Houston, Tex., to form a low-strength molding composition. One hundred eighty parts of washed silica sand of 140 AFS grain fineness number, 9 parts of Petro Bond, 3.5 parts of Petro Bond oil, and 0.1 part of P-1 catalyst were mixed and used. This low strength oil-bonded sand area 26 allows the zinc-based alloy to shrink unimpededly, thereby producing a binder ring casting with no distortion. If this central core portion 26 of the binder ring drag mold is formed of a high strength, resin-bonded molding sand, the binder ring is distorted upon solidification and shrinkage because it cannot shrink freely and predictably in the inward direction. Where this core area 26 is large, generally larger than about $0.5 \text{ m} \times 0.5$ m, it is preferred to use loose, unbonded silica sand in the center region (27 in FIG. 2) of the core 26 with the oil-bonded sand around the periphery 28 of the core portion 26. Core periphery 28 and facing layer 22 define between them the drag mold casting cavity 29 for binder ring 52 (FIG. 4).

Figure 3:
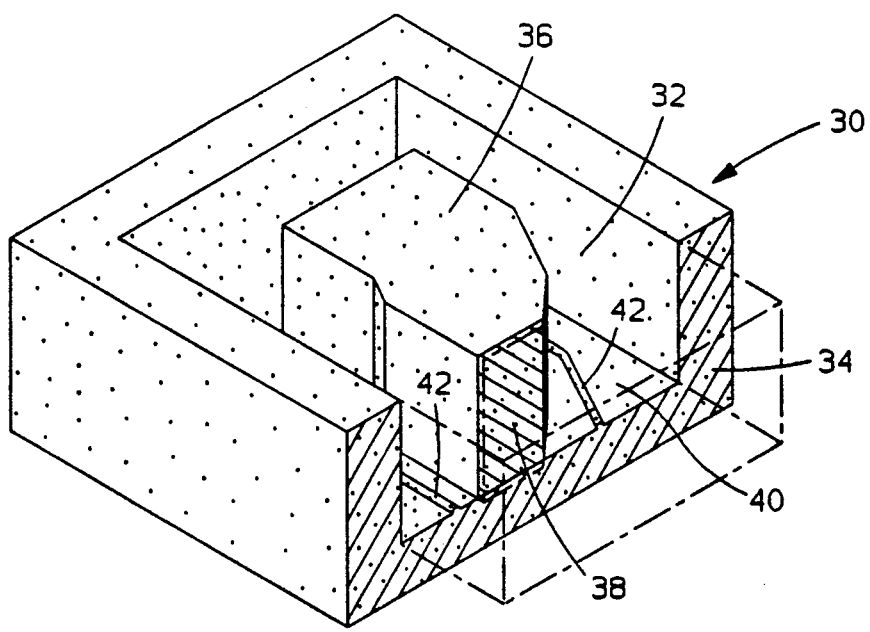
FIG. 3 is a perspective view partly broken away and in section of the drag portion of a foundry mold for casting the female punch.

FIG. 3 shows a perspective view of a drag mold 30 for the female punch (54 in FIG. 4). Again, this is a perspective view of the mold partly in section and broken away. The cavity portion 32 of the mold is configured for the casting of a female punch 54 adapted to receive the male punch 50 to be cast in mold 10. Mold 30 is made entirely of resin-bonded sand. Outer portion 34 is made entirely of resin-bonded silica sand. Core portion 36 defines the working face 60 of the female punch and, therefore, surface portion 38 of core 36 is made up of a resin-bonded zircon sand. The bottom portion 40 of mold 30, of course, defines the upper working surface of the female punch and includes a ring portion 42 molded in which is intended to form the draw bead portion 56 in the female mold.

As stated above, it is usually intended in accordance with the practice of my invention that the drag mold for the female punch be made entirely of a resin-bonded sand. However, where the depression of the cavity 32 exceeds about 100 millimeters, it is preferred to make the inner portion of core 36 from a softer oil-bonded sand like the core portion 26 in the binder ring mold 20. This allows for more uniform and predictable shrinkage of the female punch casting as it solidifies and cools to ambient temperature.

When the drag and cope portions for the male punch, the female punch and the draw ring have been completed, it is necessary to plan the timing of the casting of these separate tool details. In accordance with the practice of my invention, it is preferred to carefully schedule the pouring of these castings which may require one, two or more days so as to achieve a suitable mold shakeout temperature for each tool detail. The strategy is as follows. The male punch usually exhibits the highest dimensional accuracy as cast. Therefore, it is poured and removed from its mold first so that it will be the hardest of the warm castings and can serve as a master model for the conformation of the working surfaces of the other casting details. In contrast, a binder ring generally exhibits the largest dimensional variation and hence is shaken out of its mold last to permit it, while still warm, to conform to the female and male punches during the nesting stage of the process which will be described below. Thus, it is contemplated that the respective castings will be removed or shaken out of their molds while the castings are still well above ambient temperature.

FIG. 4 shows the three pieces in an exploded view. Male punch 50 is in the upper punch, binder ring 52 is intermediate, and female punch 54 is lowermost. Obviously, provision must be made, which is not shown in the drawing, for attachment to these large castings so that they can be handled with a crane or other suitable lifting means. The upper surface of female punch 54 is now seen to contain the draw bead ring 56 and a shelf 58 on which the binder ring 52 can rest when the tools are in their closed position.

A specific example of an actual casting and shakeout practice for a three-part automobile pillar support draw die will better illustrate this aspect of the process. Each tool detail was cast of the above-specified zinc alloy. The male punch weighed 620 kilograms, the female punch weighed 2070 kilograms and the binder ring weighed 1580 kilograms. The pouring schedule and shakeout times were as follows:

Day 1: 10:30 a.m.—Pour entire male punch at 535° C.
  10:35 a.m.—Cast female punch in two pours. The first pour at 538° C. fills the mold to just below the parting line and the second at 566° C. fills the risers. The metal in the mold was at 399° C. at the start of the second pour.

Day 2: 12:30 p.m.—Cast the binder ring in two pours with the metal at 527° C. and 583° C., respectively. The metal in the mold was at 399° C. at the start of the second pour.

Day 3: Shakeout the male and female punches at 175° C. to 205° C. Start to shakeout the binder ring at 260° C. by removing the cope to cool the casting to the desired nesting temperature of 220° C. Nest the two punches and binder ring and place about three tons on the casting assembly. The temperatures of the three details on nesting were: male punch, 120° C.; female punch, 175° C.; and binder ring, 220° C.

Figure 5:
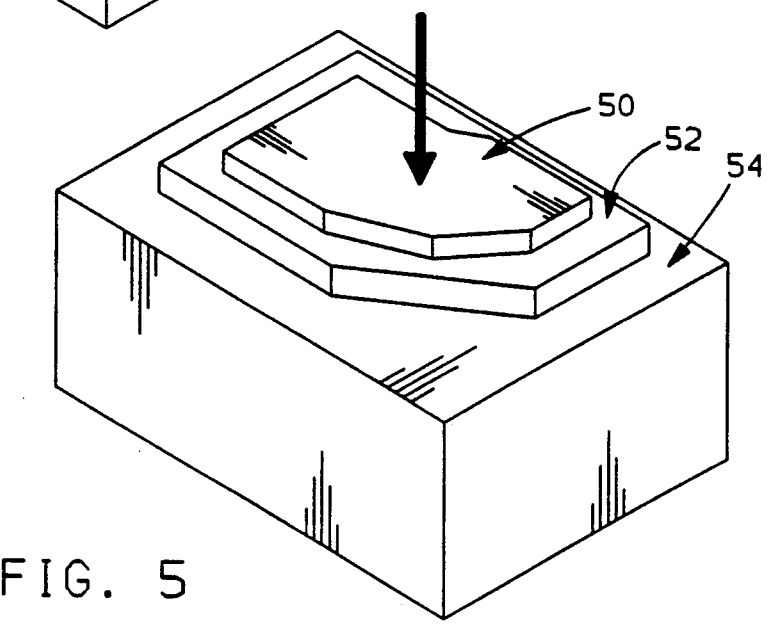
FIG. 5 is a perspective view of the three die pieces in their nested or press closed forming position.

Thus, the castings, while still warm, are nested together. The binder ring is placed on shelf 58, and male punch 50 is inserted into the female cavity through binder ring 52. The tools are shown in their nesting position in FIG. 5. In addition to the weight of the respective pieces acting against each other in their nested position, an additional compressive stress is applied in the form of 3000 kilograms of additional weight (giving a compressive stress of 70 to 100 kPa). The additional weight is indicated by the arrow in FIG. 5. The castings are then cooled to ambient temperature in the nested arrangement. The compressive stress imposed on this assembly causes the binder ring and the female punch to conform to the most accurate casting, the male punch.

After this assembly had been cooled to room temperature, the external weight was removed. The castings were processed into finished tools. The working surfaces of the three separate tool details were examined and measured to be sure that they conformed accurately to the desired surface dimensions and configuration. In the actual set of dies which was cast and nested as described above, a measurement using small clay balls of various sizes placed between the castings revealed that there was a 0.1 to 0.15 millimeter fit between the casting details. This is a remarkably close fit for three very large tool details in an as-cast condition.

An as-cast dimensional accuracy of one millimeter or better frequently means that cast tool details can be used "as is" or with moderate hand finishing of the working surface. Expensive machining set-up and operation is neither required nor desirable for such minor surface corrections.

Thus, the mold-making process which includes using a soft, yieldable core structure where interior shrinkage of the casting is to occur and hard mold surfaces on external surfaces of the casting is found to provide a significant improvement in the as-cast accuracy of the tool pieces. Furthermore, the nesting of the cast tool pieces while they are still warm enough to be plastic or pliable further shapes and conforms the separate pieces and increases markedly the accuracy of their surface on cooling. This nesting step must be practiced on the as-cast pieces while they are still cooling. It is not as effective to permit the pieces to cool to room temperature and then reheat them for such a nesting operation because the cooling and reheating introduces distortions in the cast tool details.

Although this process was developed and tailored using the specified zinc-based die alloy, it is applicable to the casting of other tooling materials including iron-base, copper-base and aluminum-base as well as other zinc-base alloys. While the specific pouring, casting shakeout and nesting temperatures will vary for each alloy, the pattern and mold preparation and gating and runner system design are similar to those that I have described above.

Accordingly, while my invention has been described in terms of a few specific embodiments thereof, it will be appreciated that other forms could readily be adapted by those skilled in the art. Therefore, the scope of my invention is to be considered limited only by the scope of the following claims.

The embodiments of the invention in which an exclusive property or privilege is claimed are defined as follows:

1. In the process of casting mating metal tool members comprising two punches having engaging surfaces for the shaping of compliant material and thereafter finishing such surfaces as necessary to achieve a predetermined configuration, the improvement in such process for reducing such finishing operation comprising separately casting each punch in a resin-bonded sand mold in which the cavity-defining face is shaped by a pattern representing the respective shaping surface with accurate allowance for shrinkage of the metal to be cast and such mold face is formed of a fine particulate sand, removing each cast punch from its mold after full solidification thereof with at least one of the castings at an above-ambient temperature at which its material-shaping surface is plastically formable, and placing the castings together and pressing their intended engaging surfaces together to plastically shape them into conformance with these predetermined dimensions.

2. A process as in claim 1 in which the material-shaping surface of one of the punches is more accurate as-cast than the second and that punch is removed from its mold and allowed to come to a lower temperature at which it presents a harder shaping surface and is used as the master tool against which the shaping face of the second punch is conformed during the pressing step.

3. In the process of casting mating metal tool members comprising a male punch, a female punch and a binder ring having engaging surfaces for the shaping of compliant material and thereafter finishing such surfaces as necessary to achieve a predetermined configuration, the improvement in such process for reducing such finishing operations comprising separately casting each punch in a resin-bonded sand mold in which the cavity-defining face is shaped by a pattern representing the respective shaping surface with accurate allowance for shrinkage of the metal to be cast and such mold face is formed of a fine particulate sand, casting the binder ring in a like resin-bonded sand mold that defines the outer periphery of the ring and with a compliant green sand inner core that defines the inner periphery of the ring.

removing each cast punch and the cast binder ring from their respective molds after full solidification thereof at an above-ambient temperature at which they are plastically formable, and placing the castings together and pressing their intended engaging surfaces together to plastically shape them into conformance so as to reduce the need for finish machining.

4. A process as in claim 3 in which the material-shaping surface of the male punch is more accurate as-cast than the female punch or the binder ring and the male punch is removed from its mold and allowed to come to a lower temperature at which it presents a harder shaping surface and is used as the master tool against which the shaping face of the female punch and the binder ring are conformed during the pressing step.

5. In the process of casting mating metal tool members comprising a male punch, a female punch and a binder ring having engaging surfaces for the shaping of compliant material and thereafter finishing such surfaces as necessary to achieve a predetermined configuration, the improvement in such process for reducing such finishing comprising separately casting each punch in a resin-bonded sand mold in which the cavity-defining face is shaped by a pattern representing the respective shaping surface with accurate allowance for shrinkage of the metal to be cast and such mold face is formed of a fine particulate sand having higher thermal conductivity and a lower coefficient of thermal expansion than silica sand, casting the binder ring in a like resin-bonded sand mold that defines the outer periphery of the ring and with a compliant oil-bonded green sand-containing inner core that defines the inner periphery of the ring, removing each casting from its mold after full solidification thereof at an above-ambient temperature at which it is plastically formable, placing the castings together with the male punch at the lower above-ambient temperature and the female punch and binder ring at respectively successively higher temperatures, and pressing the castings together with a stress greater than their respective weights, the cooler, harder male punch serving as a master tool against which the engaging surfaces of the other castings conform as they cool, so as to reduce the need for shaping surface finishing operations.

* * * * *